United States Patent [19]
Thorpe et al.

[11] 4,079,955
[45] Mar. 21, 1978

[54] LOCKING DEVICE

[75] Inventors: Leonard W. Thorpe, Inkster; Wayne H. Kind, Detroit, both of Mich.

[73] Assignee: The United States of America as represented by the Secretary of the Army, Washington, D.C.

[21] Appl. No.: 712,631

[22] Filed: Aug. 9, 1976

[51] Int. Cl.² .............................................. B62D 53/00
[52] U.S. Cl. ...................................... 280/111; 280/492
[58] Field of Search ........................ 280/111, 474, 492

[56] References Cited
U.S. PATENT DOCUMENTS 3,426,720 2/1969 Enos .......................................... 115/1
3,669,469 6/1972 Hartelins .......................... 280/111 X Primary Examiner—Philip Goodman
Attorney, Agent, or Firm—Peter A. Taucher; John E. McRae; Nathan Edelberg

[57] ABSTRACT

A rough terrain articulated vehicle wherein one vehicle section is interconnected with a second vehicle section for unrestrained relative rotation around the vehicle roll axis. Roll movement enables the respective vehicle sections to shift in accordance with terrain irregularities, thereby minimizing the need for high wheel travel. A locking or latching mechanism is provided to prevent roll rotation when the vehicle is moving over relatively smooth terrain.

2 Claims, 4 Drawing Figures

U.S. Patent     March 21, 1978     4,079,955
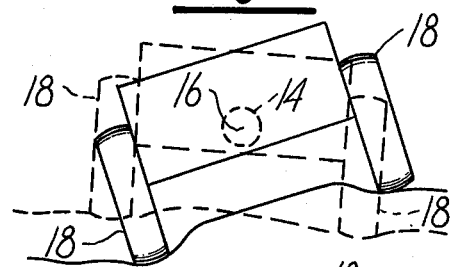
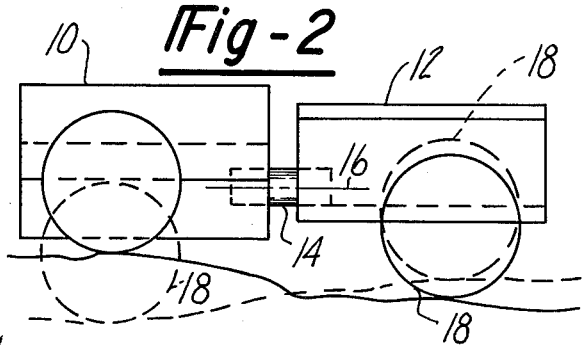
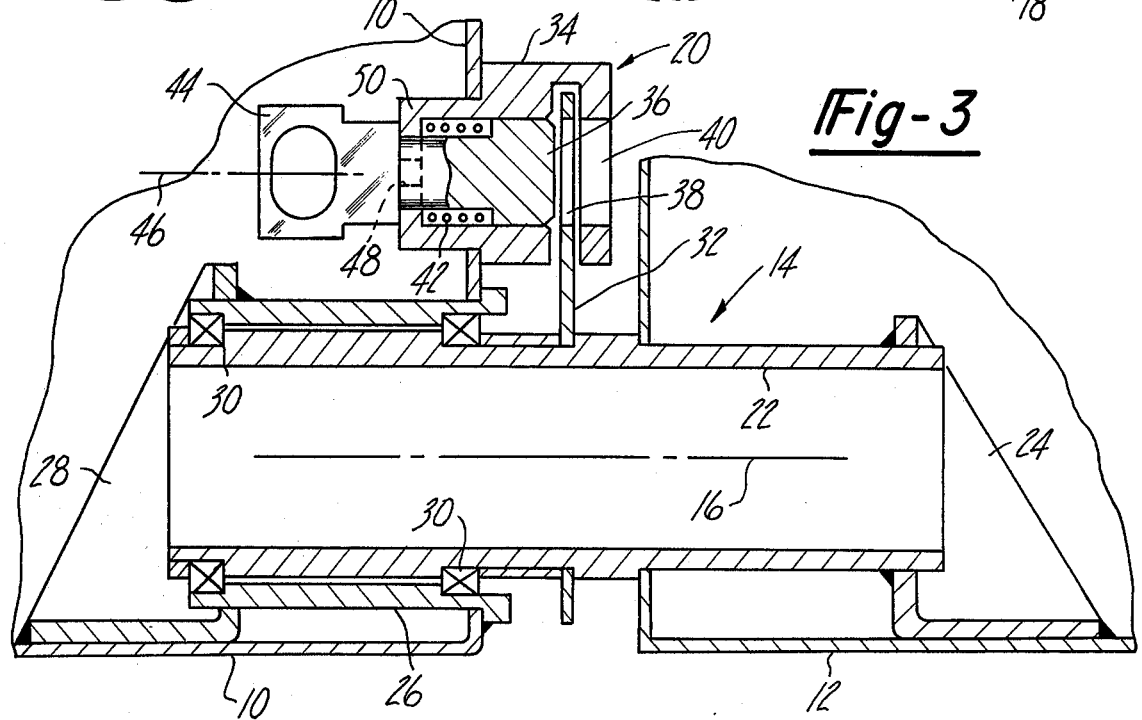
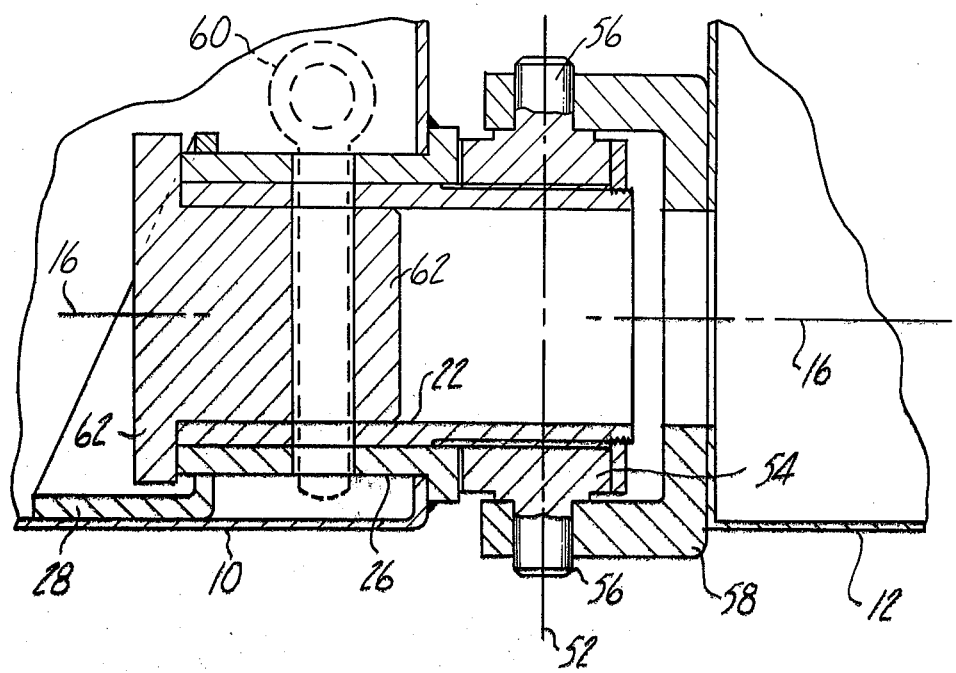

LOCKING DEVICE

BACKGROUND AND SUMMARY OF THE INVENTION

This invention relates to a vehicle similar to that shown in U.S. Pat. No. 3,426,720 issued to C. E. Enos on Feb. 11, 1969. The present invention adds a roll-lockout feature that adapts the vehicle to improved high speed performance on smooth level roads.

THE DRAWINGS

FIGS. 1 and 2 are front and side elevational views of a vehicle incorporating this invention.

FIG. 3 is a sectional view taken through a pivotal connection used in the FIG. 2 vehicle.

FIG. 4 is a sectional view illustrating a pivot connection used in another embodiment of the invention.

The vehicle shown in FIGS. 1 and 2 comprises a first vehicle section 10 of box-like construction, and a second vehicle section 12 of box-like section; an engine, not shown, would be located in one of the vehicle sections. The two sections are interconnected by means of a pivot mechanism 14 so that the respective sections can have relative pivotal motion around a central roll axis 16 extending longitudinally through the vehicle.

Each section 10 or 12 of the illustrated vehicle is equipped with two wheels 18. Pivotal connection 14 enables all four wheels to maintain ground contact in spite of terrain irregularities. As seen in FIG. 2, each of the four wheels has a different elevation without loss of ground contact.

The vehicle as thus far described is similar to the vehicle shown in the aforementioned U.S. Pat. No. 3,426,720. The present vehicle however adds a locking or latching means 20 (shown in FIG. 3) for locking out the roll movement around axis 16 when the vehicle is moving over level terrain. At such times an undesired free unrestrained roll movement could be produced by such factors as uneven payload distribution, vehicle steering inputs, application of braking forces, or side hill road surface inclinations. By locking out the roll-rotation capability this undesired condition is avoided.

The latching mechanism can take various forms; as illustratively shown in FIG. 3 the latching mechanism is incorporated into the pivot mechanism 14. This mechanism comprises a first tube 22 suitably affixed to vehicle section 12 by means of an angle bracket 24. Tube 22 extends into the other vehicle section 10 within the space circumscribed by a sleeve 26. An angle bracket 28 is used to affix sleeve 26 within vehicle section 10. Bearings 30 are interposed between elements 22 and 26 to absorb radial and thrust loads imparted to the elements by road forces.

The aforementioned latch means 20 comprises a disc 32 suitably carried by tube 22, and a caliper 34 carried by vehicle section 10. A plunger 36 is slidably positioned within calipers 34 for movement from a retracted position (shown in the drawing) to an extended position projecting into openings 38 and 40 in disc 32 and the calipers. When plunger 36 is extended into openings 38 and 40 the vehicle sections 10 and 12 are locked against relative rotation around roll axis 16. Disc 32 constitutes a keeper for the plunger-type latch element 36.

A coil spring 42 is located within calipers 34 to urge plunger 36 into openings 38 and 40; a manual actuator portion 44 is used to retract the plunger away from openings 38 and 40. Manual actuator portion 44 has a flat blade character, whereby manual rotation of the plunger around axis 46 enables blade portion 44 to register with slots 48 in flange 50 of the caliper. When manual portion 44 is released spring 42 projects plunger 36 into openings 38 and 40. Manual actuator portion 44 is accessible from within vehicle section 10 when it is necessary to retract or extend plunger 36.

Certain vehicles, especially heavier trucks, are equipped for articulation movement in two or more rotational planes, such as the roll plane and the yaw plane (for steering). FIG. 4 illustrates the invention applied to a vehicle wherein vehicle section 12 has yaw articulation around a vertical axis 52 extending normal to the aforementioned roll axis 16. For steering purposes fluid cylinders, not shown, would be extended between vehicle sections 10 and 12 in the fashion shown for example in U.S. Pat. No. 3,349,864 issued to E. B. Wagner on Oct. 31, 1967 (see cylinders 31 and 32). The vehicle fragmentarily shown in FIG. 4 includes yaw rotation capability that is unhampered by the roll rotation-lockout mechanism.

In the FIG. 4 vehicle roll rotation is achieved by means of tube 22 and cooperating sleeve 26. Sleeve 26 is affixed to vehicle section 10, as by means of angle bracket 28, whereas tube 22 is affixed to a barrel 54 having vertically projecting stub shafts 56 extending through circular openings in a yoke 58 that is suitably affixed to vehicle section 12. When the vehicle is moving over rough terrain tube 22 can freely rotate within sleeve 26 to provide roll rotation of the vehicle sections; barrel 54 and yoke 58 transmit rotational forces between vehicle section 12 and sleeve 22.

When it is desired to move the vehicle over smooth terrain a locking pin or plunger 60 is manually inserted through aligned openings in tube 22 and sleeve 26, thereby locking out the vehicle roll-rotation capability. In the vehicle shown in FIG. 4 tube 22 is equipped with a plug 62; the plug is suitably affixed to tube 22, after which the hole is drilled through the tube and plug to form a passage for the removable locking element 60.

As before noted, the essential feature of this invention is the latch mechanism for locking out the vehicle section roll capability when it is desired to move the vehicle over smooth terrain. In its preferred forms the latch mechanism is accessible from within one of the vehicle sections, e.g. the driver section. In its more exotic form the latch or brake mechanism could be power-actuated (i.e. by hydraulic cylinder); however for most applications a manual actuation concept is preferred because of cost considerations.

The latch mechanism is actuated while the vehicle is standing idle on smooth terrain. At such times the locking apertures should be aligned to receive the locking plunger 36 or 60. If the apertures are not properly aligned it may be necessary to use a friction brake instead of the positive-action plunger.

The invention is capable of some modification within limits of the appended claims.

We claim:

1. In a rough terrain articulated wheeled vehicle wherein a first vehicle section is interconnected with a second vehicle section for unrestrained relative rotation around the vehicle roll axis: the improvement comprising cooperating latch elements carried by respective ones of the vehicle sections for locking engagement, to thereby prevent rotation of the sections in the roll direction when it is intended to move the vehicle over relatively smooth terrain; said cooperating latch elements comprising a keeper (32) carried by one of the vehicle sections and a plunger mechanism carried by the other vehicle section; said plunger mechanism comprising a slidable plunger (36) having a manual engagement portion (44) for retracting said plunger away from the keeper and spring means (42) for advancing said plunger toward the keeper.

2. In the wheeled vehicle of claim 1: the vehicle interconnection comprising a tube (22) extending from one vehicle section into a cooperating sleeve (26) in the other vehicle section; the aforementioned keeper comprising an apertured element (32) extending radially from the tube in the space between the two vehicle sections, and the aforementioned plunger being mounted on the other vehicle section for slidable movement parallel to the tube-sleeve axis.

* * * * *